(12) United States Patent
Vanden Heuvel et al.

US008819034B2

(10) Patent No.: US 8,819,034 B2
(45) Date of Patent: Aug. 26, 2014

(54) METHOD AND APPARATUS FOR GENERATING A NEW EVENT DIRECTLY FROM A DOCUMENT

(75) Inventors: David Vanden Heuvel, Kanata (CA);
Darrell Reginald May, Waterloo (CA);
Michael Thomas Hardy, Waterloo (CA); Lap Luu, Markham (CA)

(73) Assignee: Blackberry Limited, Waterloo (CA)

( * ) Notice: Subject to any disclaimer, the term of this patent is extended or adjusted under 35 U.S.C. 154(b) by 920 days.

(21) Appl. No.: 11/302,261

(22) Filed: Dec. 14, 2005

(65) Prior Publication Data
US 2007/0150513 A1    Jun. 28, 2007

(51) Int. Cl.
*G06F 7/00*     (2006.01)
*G06F 17/30*    (2006.01)

(52) U.S. Cl.
USPC .......................................... 707/755; 707/758

(58) Field of Classification Search
CPC .......... G06Q 10/06311; G06Q 10/109; G06Q 10/1093; G06Q 10/1095
USPC ................................................ 707/755, 758
See application file for complete search history.

(56) References Cited

U.S. PATENT DOCUMENTS

| | | | |
|---|---|---|---|
| 5,946,647 A | 8/1999 | Miller et al. | |
| 6,505,167 B1 | 1/2003 | Horvitz et al. | |
| 6,983,310 B2 * | 1/2006 | Rouse et al. | 709/206 |
| 7,584,253 B2 * | 9/2009 | Curbow et al. | 709/206 |
| 7,620,689 B2 | 11/2009 | LoBuono et al. | |
| 8,065,362 B2 * | 11/2011 | Greven et al. | 709/203 |
| 8,346,777 B1 * | 1/2013 | Auerbach et al. | 707/741 |
| 2002/0087620 A1 | 7/2002 | Rouse et al. | |
| 2002/0184321 A1 * | 12/2002 | Fishman et al. | 709/206 |
| 2004/0044644 A1 * | 3/2004 | Brady et al. | 707/1 |

(Continued)

FOREIGN PATENT DOCUMENTS

EP    1109121 A     6/2001
JP    11 259568 A    12/1999

(Continued)

OTHER PUBLICATIONS

Visualization Components for Persistent Conversations, Smith et al, Conference on Human Factors in Computing Systems, Seattle, WA, 2001.

(Continued)

*Primary Examiner* — Mariela Reyes
(74) *Attorney, Agent, or Firm* — Richard A. Johnson; Borden Ladner Gervais LLP (57) ABSTRACT

The application relates to the field of communications and more particularly to an apparatus and method of generating a new event from a document. In accordance with one aspect of the present application, recognized date/time references contained in a document allow a new event to be created. Such date/time references are automatically recognized and highlighted in the document. Selecting the highlighted information generates a menu selection, offering a user the ability to create a new event into which the date/time information will be inserted, along with other information extracted from the document. Specific date/time information in a document is simply correlated to a known date/time format in a lookup table, while relative terms like "tomorrow", "today" or days of the week (ie. Monday, Tuesday, Wednesday, etc.) are recognized by a date/time detector module and translated into a specific date/time. Using an embodiment of the present application, a new event can be readily generated.

39 Claims, 6 Drawing Sheets

(56) References Cited

U.S. PATENT DOCUMENTS

| | | | |
|---|---|---|---|
| 2004/0199423 A1* | 10/2004 | LaBrosse et al. | 705/14 |
| 2004/0243677 A1 | 12/2004 | Curbow et al. | |
| 2005/0021858 A1* | 1/2005 | Ruston et al. | 709/246 |
| 2007/0079260 A1* | 4/2007 | Bhogal et al. | 715/963 |
| 2007/0226204 A1* | 9/2007 | Feldman | 707/5 |
| 2008/0066018 A1 | 3/2008 | Zinn et al. | |

FOREIGN PATENT DOCUMENTS

| | | |
|---|---|---|
| WO | 2004-029772 | 4/2004 |
| WO | 2005/079336 A2 | 9/2005 |
| WO | 2007121329 A | 10/2007 |

OTHER PUBLICATIONS

European Search Report, Feb. 14, 2006.

European Search Report dated Jul. 29, 2009, issued in respect of European Patent Application No. 09154057.5.

Beard D et al: "A Visual Calendar for Scheduling Group Meetings" Proceedings of Conference on Computer-Supported Cooperativework, Oct. 7-10, 1990, Los Angeles, New York, NY, US, Oct. 7, 1990, pp. 279-290, XP001013928.

"Dates and Times in Email Messages" Mia K. Stern, IBM Research, pp. 328 to 330, IUI'04, Jan. 13-16, 2004, Madeira, Funchal, Portugal. ACM 1-58113-815-6/04/0001.

http://www.miramontes.com/writing/add-cacm/ "Collaborative, programmable intelligent agents" Bonnie A. Nardi et al, miramontes interactive, Innovative information management: Apple Data Detectors, Mar. 1998.

Office Action dated Oct. 15, 2010, issued from the corresponding Canadian Patent application No. 2,570,859.

Examiners Report dated Apr. 18, 2011, issued in respect of corresponding Canadian Application No. 2,570,859.

Examiner's Report dated May 21, 2013 issued against corresponding Canadian Patent Application No. 2,570,859.

* cited by examiner

METHOD AND APPARATUS FOR GENERATING A NEW EVENT DIRECTLY FROM A DOCUMENT

BACKGROUND OF THE INVENTION

1. Field of Invention

The application relates to the field of communications and more particularly to an apparatus for and method of generating a new event from a document.

2. Description of the Related Prior Art

As will be understood by those in the art, a user can enter text into an email in plain text and certain recognizable elements or patterns of the plain text can be translated or displayed using hypertext markup language (html) hyperlinks for added functionality. For example, when an email address, a universal resource locator (URL) or a phone number is entered into an email, a hyperlink can be generated. For example, a typed email address could appear in html as:

<A HREF="mailto:john.doe@testsite.com">john.doe@testsite.com</A>

The hyperlink usually appears as underlined text in a contrasting colour. When the email is displayed, the hyperlink can be used to invoke an application. In the above example, if john.doe@testsite.com is selected by the recipient, a new email message could be generated and john.doe@testsite.com would be inserted into the "TO:" field of the new email message. Similarly, if a hyperlinked URL is selected by a user, a browser application is automatically opened and the page identified by the URL is displayed. In the case of a phone number, a dialing application is invoked and the number is dialed.

As those skilled in the art will appreciate, many times, a user will receive a meeting invitation in the form of an email rather than a formal meeting request created through a calendar application like Microsoft® Office Outlook®. Alternately, many times a discussion occurs via an email thread which ultimately results in a meeting to resolve outstanding issues. In either case, if the user wishes to create an event based on the originating email, the user must open an application and create the event by manually entering the event details, or cutting and pasting from the originating email thread. Although this works adequately, it would be preferable if an event could be easily generated in an application directly from the originating email.

BRIEF DESCRIPTION OF THE DRAWINGS

A better understanding of the present application will be obtained by considering the detailed description below, with reference to the following drawings in which.

DESCRIPTION OF THE PREFERRED EMBODIMENT

In order to overcome the limitations of the current state of the art there is provided in the present application an apparatus for and method of generating a new event directly from a document. The new event could be a calendar event or task for example, but other types of event are also considered to be in the scope of the present application. The document could be an email or webpage for example, but other types of document are also considered to be in the scope of the present application.

In one embodiment, the time and date of the event contained in an email is automatically recognized and displayed to the user in the style and function of an html hyperlink. Selecting the time and date hyperlink generates a menu selection, offering a user the ability to create a new event into which the date/time information will be inserted, along with other information extracted from the email. For example, the subject of the event is extracted from the subject of the email, while the event attendees are taken from the "TO", "CC" and "BCC" fields. Specific date/time information in an email is correlated to a known date/time format in a lookup table and then inserted into the new event. Relative terms like "tomorrow", "today" or days of the week (ie. Monday, Tuesday, Wednesday, etc.) are hyperlinked as well. Using a date/time detector module, relative terms could be translated into specific date/time entries which are inserted into the new event. In one embodiment, the date/time detector module comprises a lexical analyzer and parser to correlate words relating to time and date, to a specific date and time that can be used and recognized by an application, such as a calendar application or tasks application. In an alternate embodiment, an email thread is analyzed by a thread detector module and, if the number of replies in the email thread exceeds a defined threshold, the user is prompted to create an event via a menu selection. Similar to the first embodiment, if the user chooses to create an event, pertinent information such as subject and attendees is extracted from the email and inserted into the newly created event. An additional feature relative to both of the above embodiments, provides for a link to be inserted into the event which can be used to access the complete email from which the event was created.

In accordance with a first aspect of the present application there is provided a document filtering apparatus for use in a network communications system, said apparatus comprising: (a) a storage device for storing a document; and (b) a detector module communicating with said storage device for receiving said document, said detector module mapping information contained in said document to a new event.

In one embodiment, the detector module is a date/time detector module, wherein prior to said mapping, said date/time detector module: (i) identifies date and time entries in said document; and (ii) creates a hyperlink for each of said identified date and time entries.

In another embodiment, the detector module is a thread detector module, said document is an email message, and wherein prior to said mapping, said thread detector module: (i) identifies a thread in said email message; and (ii) if a defined threshold is exceeded, prompts a user to create said new event.

In accordance with a second aspect of the present application, there is provided in a network communications system, a method of creating a new event comprising: (a) storing a document in a storage device; (b) receiving said document from said storage device into a detector module; (c) analyzing said document; and (d) based on identified information in said document creating said new event.

Preferably, the step of creating a new event comprises; (a) generating a hyperlink for each of said identified first type of date and time entries and each of said identified second type of date time entries; (b) upon selection of said hyperlink by a user, presenting the user a choice of event type to be created; (c) upon selection of said choice of event type by the user, opening an application capable of creating said new event of said choice of event type; and (d) mapping specified fields in said document to specified fields in said new event.

The advantage of the method and apparatus disclosed in the present application is now readily apparent. When a user receives a document which has date/time information contained therein or an email thread which exceeds a defined threshold, a new event can easily be generated through date/time hyperlinks in the document or through a menu prompt arising from the email thread analysis. In either case, information contained in the document or email thread is readily mapped to the newly created calendar event or task.

Figure 1:
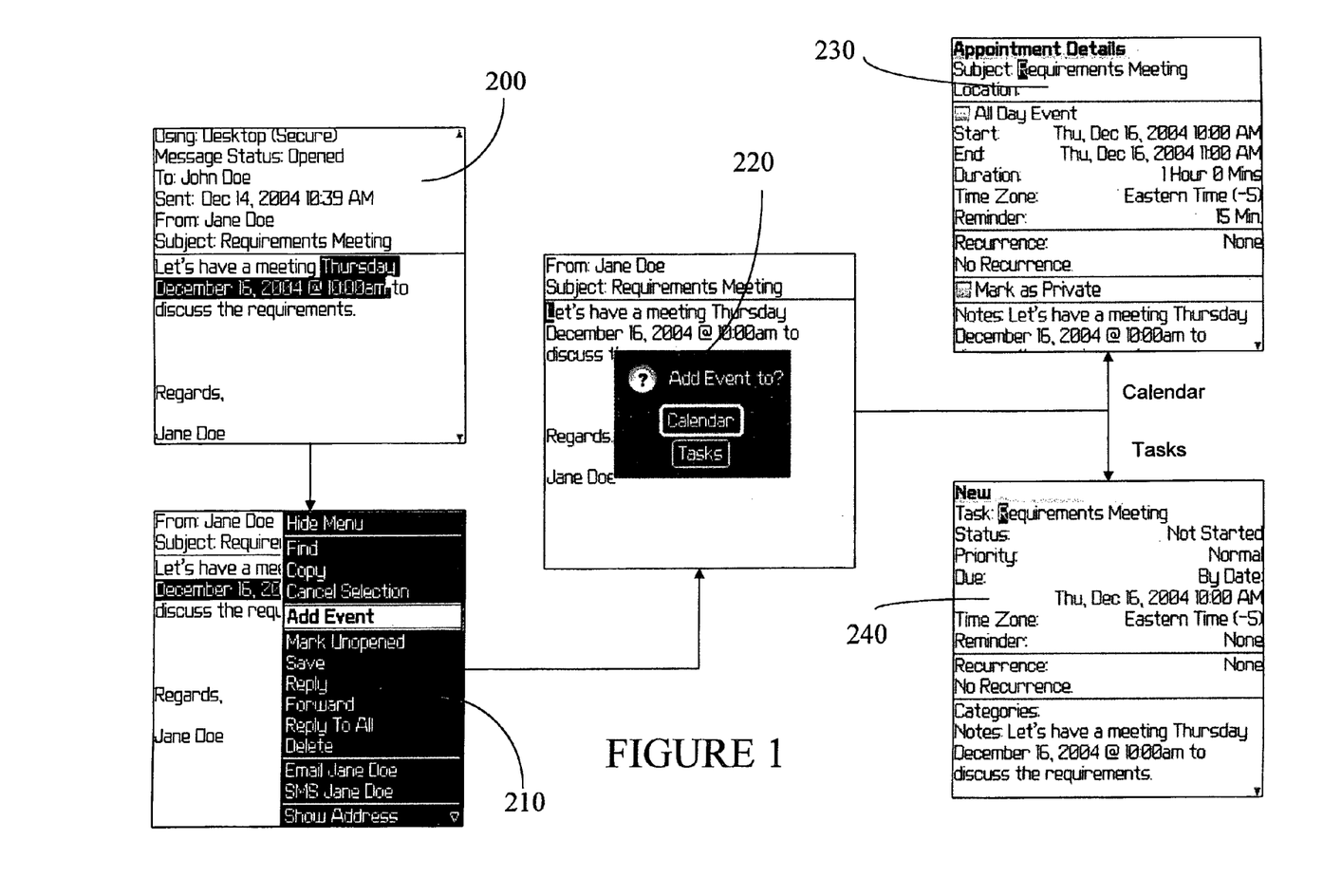
FIG. 1 depicts a sample user interface through which a new event can be created.

FIG. 1 depicts a sample user interface through which an event can be created in accordance with a first embodiment. As shown in the drawing, a user receives document 200 and selects the highlighted date in the body of document 200. It should be understood by those skilled in the art that the document 200 could be an email message, a peer-to-peer personal identification number (PIN) message, short message service (SMS) message, multimedia messaging service (MMS) message, Instant Message, or the like and all such messages or documents, including web pages and word processing documents, are meant to be included within the scope of the application. A menu 210 generated from which the user selects "add event". The user is then prompted with a further menu 220 which asks whether they want to define a new calendar event or task for example but other event types are possible. If a calendar event is selected then calendar event screen 230 is generated and the information contained in document 200 is mapped to the various fields contained in calendar event screen 230. Alternately, if a task is selected then task screen 240 is generated and the information contained in document 200 is mapped to the various fields contained in task screen 240.

Figure 2:
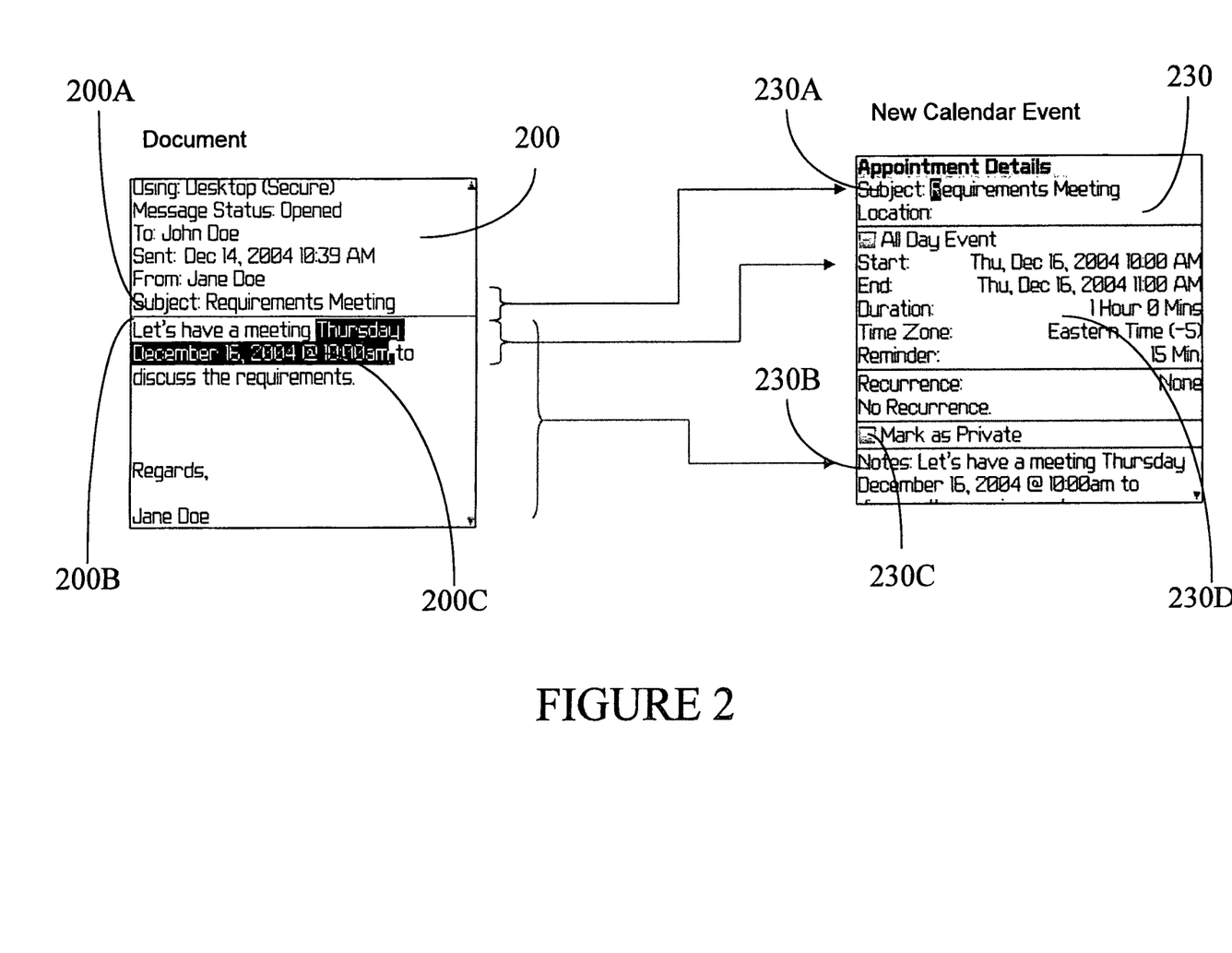
FIG. 2 depicts the typical mapping pattern from an email to a calendar event.

FIG. 2 depicts the typical mapping pattern from document 200 to a new calendar event. As can been seen in the drawing, the subject 230A of the new calendar event is taken from the subject 200A of document 200. Meeting attendees (not shown) of the new calendar event are taken from the "To:" and "From:" lists of document 200 (CC list could be optional). Event Notes 230B are copied from the body 200B of document 200. Instead of simply copying body 200B of document 200 into Notes 230B, it is possible to insert an identifier into Notes 230B through which the body 200B of document 200 could be ascertained. This identifier could for example be a reference identifier, which uniquely references an email. One advantage of inserting a reference identifier into Notes 230B instead of inserting body 200B occurs in wireless messaging environments. In such an environment, it is beneficial to limit the amount of bandwidth used to communicate messages. If a reference identifier can be communicated wirelessly, instead of the actual body 200B of the document 200, bandwidth can be saved, saving a user money and wireless device battery power. The meeting privacy setting 230C could be determined by looking up the Sender in the address book. If the Sender is categorized as a personal (as opposed to business) contact, the calendar event privacy setting 230C could be marked as private.

With respect to the date and time entry for the calendar event, the date and time information is taken from the highlighted field 200C and inserted into time and date field 230D. Where actual times and dates are clearly indicated in document 200, recognition is relatively straightforward. It is simply a matter of using a lookup table to match the format of the given date or time, extract the required date or time information, and then insert the extracted information into the calendar event. For example, typical date and time formats contained in document 200 may include:

| Date Formats | Time Formats |
|---|---|
| MM/DD/YYYY | hh:mm [24 hour format] |
| MM/DD/YY | hh:mm AM or PM (12 hour format) |
| YYYY/MM/DD | hh:mmTZD (Time Zone Designator) |
| dd Month YYYY | hh o'clock |
| Month dd YYYY | |

If only YY is given for the year, the initial two digits are inferred from a "reference date", to be discussed below. As well, other valid separators which are recognized besides a backslash or colon include a comma, period, dash or space. Similarly, the following days of the week and month format are recognized:

| Days of the Week Formats | Month Formats | |
|---|---|---|
| Monday, Mon, Mo | January, Jan | August, Aug |
| Tuesday, Tues, Tue, Tu | February, Feb | September, Sept, Sep |
| Wednesday, Wed, We | March, Mar | October, Oct |
| Thursday, Thurs, Thu, Th | April, Apr | November, Nov |
| Friday, Fri, Fr | May | December, Dec |
| Saturday, Sat, Sa | June, Jun | |
| Sunday, Sunday, Su | July, Jul | |

The above formats are only meant to serve as examples of the possible date/time formats which could be matched to entries in the lookup table integral to the present embodiment. As will be appreciated, other expressions/abbreviations and their translations to other languages could also be included in the lookup table and are meant to be included within the scope of the present application. It is also possible to use a scheduling mechanism to select the date and time most proximate to the date and time inferred from the document, where each meeting attendee is available.

A more difficult scenario arises if relative terms are used to describe the preferred time and date in document 200. Relative dates can be in formats listed above with missing information, or they can be expressed in words such as: Today; Tomorrow; and Yesterday. Time of day relative expressions include Morning, Noon, Afternoon, Evening, Night. Holidays (e.g. Christmas, New Year's, Thanksgiving, Easter, Valentine's Day, etc.) must also be accommodated. In the present embodiment, a date/time detector module (see FIG. 3) correlates generic words relating to time and date, to a specific calendar entry (i.e. date and time). The date/time detector module is essentially comprised of a sophisticated lexical analyzer communicating with a parser and symbol table (all of which are discussed below in relation to FIGS. 4 and 5). It should be appreciated that the preferred date and time resolution is to the minute (i.e. year, month, week, day, hour and minute), since such resolution is often required for a complete calendar event or task entry.

Critical to the resolution of a relative term is the determination of a reference date. A reference date is selected to infer any missing components of an incomplete or relative date/time. Examples of a Reference Date include (but are not limited to): Sent date of an email; Received date of an email; or Current date. The present embodiment uses a reference date inference rule (RDIR) to handle incomplete or relative terms used in document 200. Given a reference date and an incomplete (or relative date), an absolute date is inferred using the RDIR. The inference rule will determine how to apply the relative date to the reference date.

EXAMPLE

Relative date happens in a future day/month/year
Relative date happens in the current day/month/year
Relative date happens in a past day/month/year
Relative date happens at a fixed point in time.

For example, if the relative term "tomorrow" is indicated in the email, this term is compared to the Sent date of the email and the day following that date is deemed to be the date to be entered into the calendar event/task. Incomplete or missing information in the date contained in the email can also be inferred. For instance, "September 27$^{th}$" is inferred to be within the same year as the message was sent unless the inferred meeting date would fall before the current date, in which case the assumption would be that the meeting will occur in the future (i.e. the next year) rather than the present year (e.g. if an email is sent on December 30$^{th}$ for a meeting on January 5$^{th}$, the reference date inference rule would deem the meeting to be in the next year). It should be appreciated that the RDIR may change to suit the application or situation. It should also be appreciated that when a user selects a hyperlinked relative date/time entry, a display subset of absolute dates in order of probability is generated. The user's selection is entered as the default for future occurrences of the relative term.

Recurring calendar entries can also be inferred if a range of dates is detected. In order to handle situations where ambiguity arises, a default convention is established. For example, the statement "Monday to Friday" could be considered a single event with a duration of days, or five separate events occurring daily starting Monday and ending Friday. In such cases a default can be defined which may be modified as more information becomes available. For instance "Monday-Friday" could default to specifying a 5 day duration but "9:00 am Monday-Friday" would indicate 5 separate events occurring at 9:00 AM each day. Plural use of months and/or days of the week also indicate recurrence (e.g. Fridays). Recurrence is also specified using such expressions as "every Friday".

The embodiment as previously described focuses on detecting date/time information in a document and providing a hyperlink for the detected date/time. If the hyperlink is selected an application could be started in which a new event based on the hyperlinked date/time can be created. An event could also be triggered based on the detection of a pattern within a communication thread. As those in the art will appreciate, a thread can be comprised of a series of messages regarding the same subject. The term thread is generally applied to email messages, "an email thread", but is applicable to other types of message. Generally, the message which started the thread is followed chronologically by message responses from other recipients, thereby allowing the other recipients to follow the entire virtual conversation. In an alternate embodiment, a predefined trigger will be monitored to determine if action needs to be taken. An exemplary trigger could be the number of responses in a message thread. If the number of responses exceeds a defined threshold, the trigger will fire and the user will be presented with the option to create an event by, for example, invoking a menu selection or selecting an option in a dialog box. If the user chooses to create an event, the appropriate application (calendar application or tasks application for example) is invoked and the information in the email such as subject and attendees is mapped to the specified fields in the newly created event. With respect to the date of the event, a default date (i.e. the day following the date of the last entry in the email thread) is inserted into the event and manually changed if it is not suitable. As will be appreciated by those in the art, instead of using a threshold based on the number of responses in the email thread, other characteristics may be used. For example, the span of time that the email thread has been active could be analyzed and if it exceeds a defined period of time, the user will be prompted to create an event. Another threshold could be based on the number of people which have been added/removed from the "TO" and "CC" list i.e. if the number added exceeds a defined threshold the creation of an event will be prompted. Similar to the first embodiment discussed above, a thread detector module is used to locate an email thread and the information which will be assessed against the defined threshold.

Figure 3:
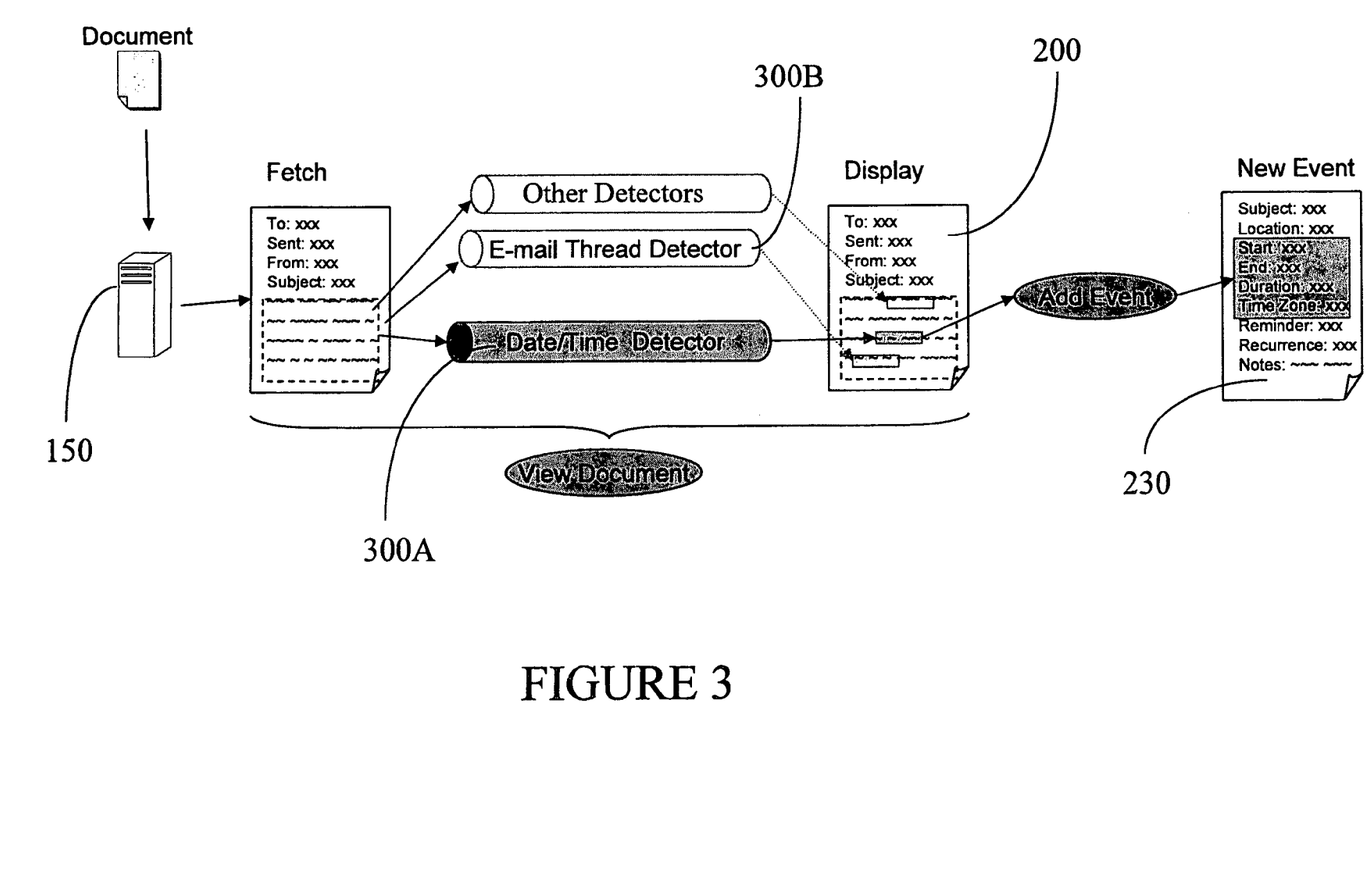
FIG. 3 depicts the system configuration used to filter a document.

Referring to FIG. 3, the system configuration used to filter a document in either embodiment is depicted. This document could be an email for example. Document 200 is stored in a memory device 150, such as a mailbox, which could include a memory device associated with the server of an Internet service provider (ISP) or the server in a local area network (LAN) or a mailbox database on a handheld wireless device or any other memory device associated with a computing device, such as a personal computer. When document 200 is requested by, a user for example, a fetch command removes document 200 from memory device 150 and forwards it to a date/time or thread detector module 300A, 300B). The date/time or thread detector module scans document 200 using a lexical analyzer 310 cooperating with a parser 320 and a symbol table 330 (see FIG. 4) and identifies all date/time/thread related information. In the case of date/time expressions, a hyperlink can be used in document 200 for each expression identified. The user could select the hyperlink, creating, as discussed above, a new event. In the case of a detected email thread, the user is prompted to create a new event. As understood by those in the art, date/time and thread detector module are shown in FIG. 3 as separate entities although the combined functionality may be contained in a single entity.

Figure 4:
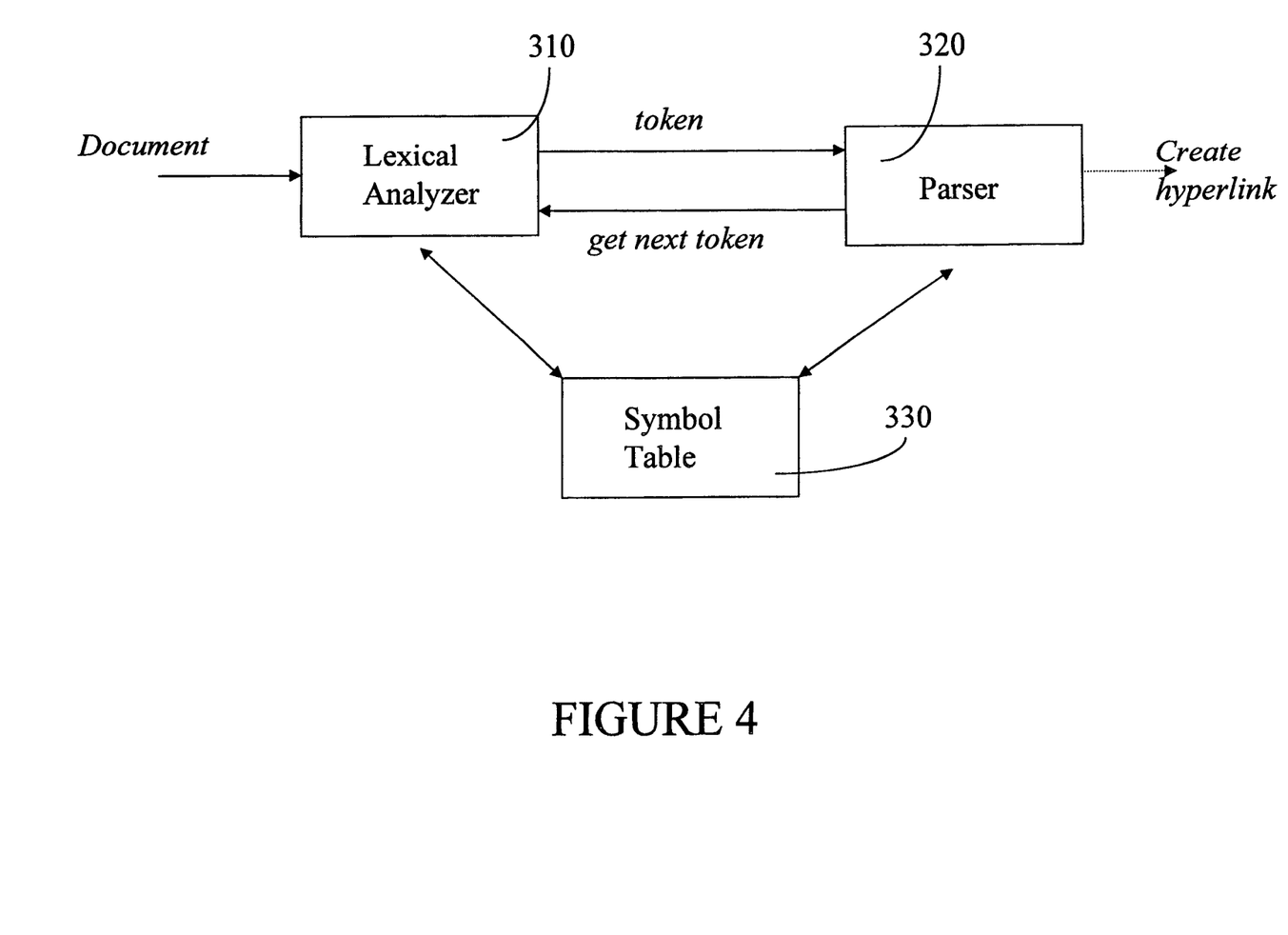
FIG. 4 depicts the interaction of a lexical analyzer, parser and symbol table.

Referring to FIG. 4, the purpose of lexical analyzer 310 is to take a stream of input characters and decode them into higher level tokens that a parser can understand. Parser 320 takes the output of the lexical analyzer and operates by analyzing the sequence of tokens returned. Data structure or symbol table 330 is generally used to store information about source language constructs. This information is collected during an analysis phase and used during a synthesis phase to generate target code. For example, during lexical analysis, the character string, or lexeme, forming an identifier is saved as an entry in symbol table 330. The entry may be later augmented with information such as the type of identifier, its usage (e.g. procedure, variable or label) and its position in storage. During generation of the target code, this information is used to create the proper code to store and access the identifier.

Figure 5:
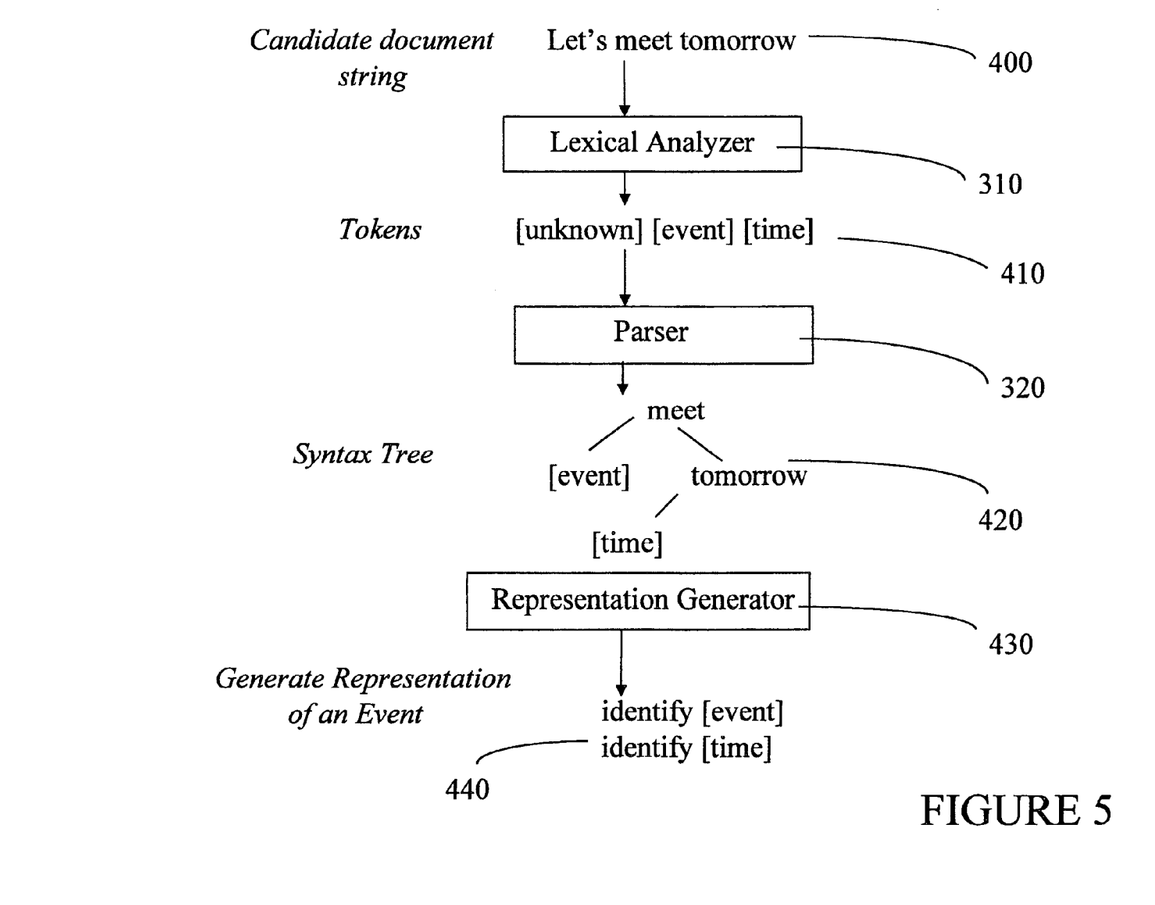
FIG. 5 depicts the process of generating a representation of an event using the constructs of FIG. 4.

As shown in FIG. 5 for example, lexical analyzer (or scanner) 310 uses patterns that match strings in the candidate document string 400 and converts the string to one or more tokens 410. Tokens 410 are representations of the text string and simplify processing. As lexical analyzer 310 finds identifiers in the candidate document string 400, it enters them in symbol table 330. Symbol table 330 may also contain other information such as data type (integer or real) and location of the variable memory. All subsequent references to identifiers refer to the appropriate index of symbol table 330. Parser 320 uses grammar rules that allow it to analyze tokens 410 from lexical analyzer 310 and create a syntax tree 420. Syntax tree 420 imposes a hierarchical structure on tokens 410. For example, operator precedence and associativity are established in syntax tree 420. Representation of an event generator 430 generates a representation of an event 440 from the syntax tree 420. Using representation of an event 440 as an input, a new event can be created using an application, such as a calendar application or tasks application.

Figure 6:
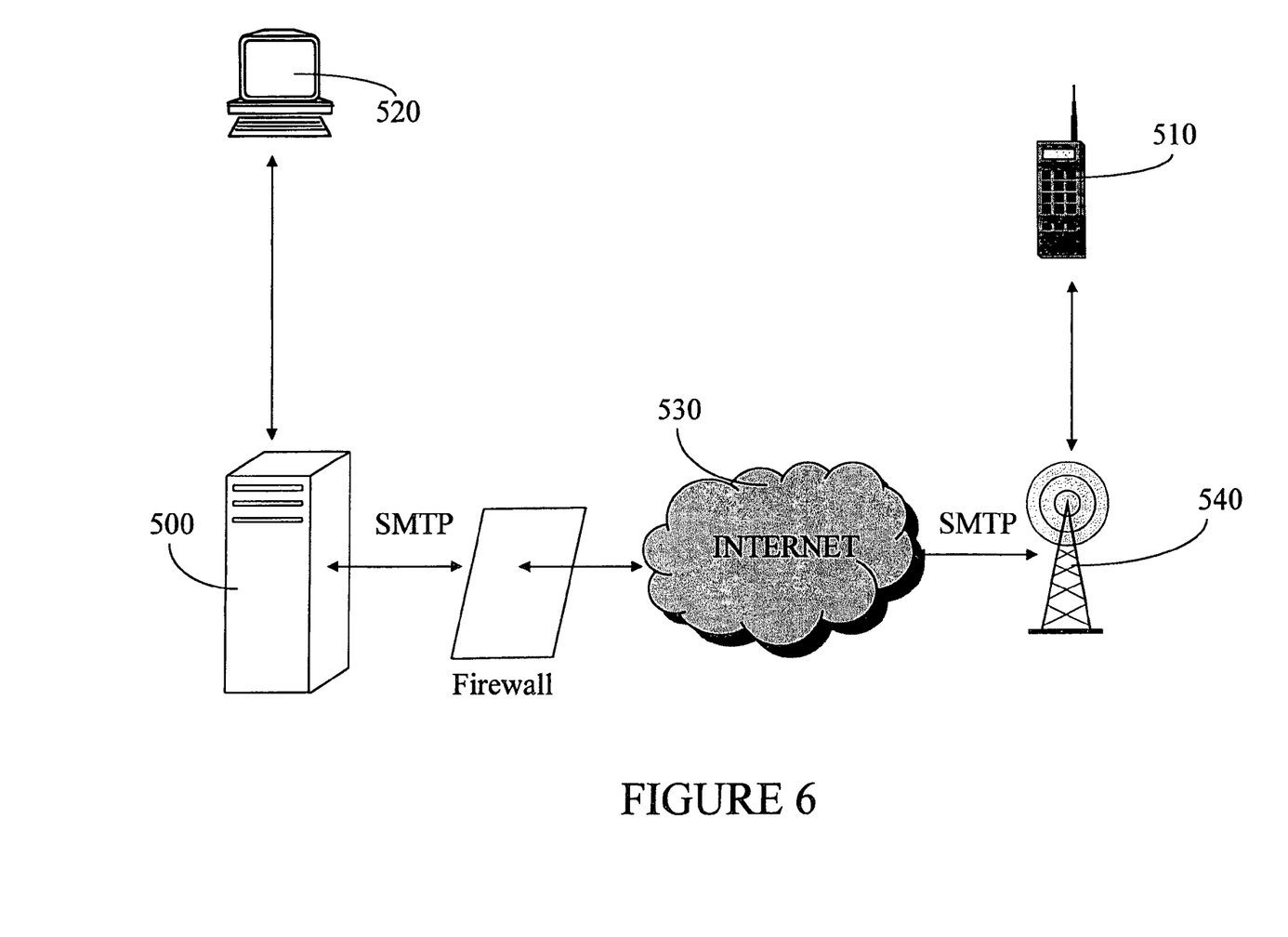
FIG. 6 depicts a wireless network supporting email.

Referring to FIG. 6, a wireless network supporting synchronized email is depicted. When an email arrives at mail server 500 for the user of wireless device 510, an email redirector in desktop 520 is notified. Mail server 500 could for example be a Microsoft® Exchange® server of a Lotus® Domino® server or a Novell® Groupwise® server. The email redirector retrieves a copy of the email message, compresses and encrypts it and sends it via the Internet 530 to wireless network 540. The outgoing message is unreadable email that can only be decrypted by wireless device 510. Wireless network 540 then delivers the email message to wireless device 510. At wireless device 510, the message is decrypted and decompressed and the user is notified of its arrival. The path from wireless device 510 to desktop 520 follows the same steps, except in reverse. When an email message is composed on wireless device 510, it is compressed, encrypted and sent back to the user's desktop 520 over wireless network 540 and Internet 530. Once retrieved from mail server 500, the redirector in desktop 520 decrypts and decompresses the email message and places it in the Outbox associated with an email application running on desktop 520 (e.g. Microsoft® Office Outlook®). The result of the above email transmission and reception process is that there is no difference between the email message that is sent from wireless device 510 and a message that is sent from desktop 520—they both appear to originate from the user's corporate email address and a copy is placed in the user's Sent folder associated with Outlook. In addition to the above, when a lengthy email arrives in the user's corporate inbox, only the first two kilobytes of the message body is initially sent to wireless device 510. If an attachment is sent in the email, only the file name and attachment are sent. If the user wishes to read more of the message, the user, using wireless device 510, can request the next two kilobytes to be sent from mail server 500.

In accordance with the present application, a method can be triggered based on the detection of date/time information or an email thread matching specified parameters. If the user (at wireless device 510 or desktop 520) chooses to create a new event based on the triggered method, an application could be invoked and the information in the email such as subject and attendees could be mapped to the specified fields in the newly created event. Additionally, the body of the email could be copied into the Event Notes section of the calendar event. In accordance with another aspect of the present application, if a calendar event is created by a user (at wireless device 510 or desktop 520) based on the detection of date/time information or an email thread, a link to the email thread could be included in the Event Notes section of the event when the event is created. The link could be, for example, a reference identification (ID) of the email stored in mail server 500. The reference ID could for example be a MIME reference ID. By including the reference ID in the notes section, the message's content itself does not need to be sent over the air to wireless device 501. If the wireless device 501 does not already have the message, a request for the message's content could be made to mail server 500 if and when necessary. This will save both bandwidth and battery life. The email could be contained in the message list associated with the email application of wireless device 510. When the email is requested by the user, it will be displayed if found in the message list. Otherwise, a request will be sent to mail server 500 to retrieve the message. The request places the email in the message list and not in the notes section of the calendar event. This ensures that only one copy of the email is physically resident on wireless device 510 instead of a copy appearing in both the event and the message list.

Although the use of date/time information to generate a new calendar event or task have been the only exemplary embodiments of the present application which have been disclosed, it should be apparent to those skilled in the art that the generation of a new calendar event or task are only representative of the kind of applications for which the mined date/time information could be useful. For example, one such additional application for which date/time information could be relevant includes a billing application. In this case, a recipient may wish to log their time in relation to work performed for a particular client. Through an additional menu selection, the date/time information received in document 200 could be logged into a billing application which would ultimately generate an invoice for the client. Such alternate uses of the mined date/time information are meant to be included within the scope of the present application. Further, as an alternate to a received email, date/time information may be mined from a web page and a hyperlink created from which a new event can be created. Still further, those skilled in the art will appreciate that the method an apparatus which have been described could be interchangeably used in a terrestrial or wireless network supporting, in particular, email and browser functions.

A person understanding this application may now conceive of further alternative embodiments or variations of the above all of which are intended to fall within the scope of the present application as defined in the claims that follow.

We claim:

1. A method comprising:
    identifying a temporal expression in an electronic message;
    generating a user-selectable hyperlink corresponding with the temporal expression which was identified;
    displaying a body of the electronic message in response to the identifying, the body including the hyperlink;
    receiving, during the displaying of the body, an input that indicates selection of the hyperlink;
    displaying a data entry interface based on receipt of the input, the data entry interface configured with a temporal field that is populated with the temporal expression;
    receiving, during the displaying of the data entry interface, another input that indicates acceptance of information in the data entry interface, the information including the temporal expression; and
    storing, in response to the another input, an event based on the information.

2. The method of claim 1, further comprising mapping text in the electronic message to another field of the data entry interface.

3. The method of claim 2, wherein mapping text comprises associating a subject of the electronic message with a subject field of the data entry interface.

4. The method of claim 2, wherein mapping text comprises associating at least one of a sender of the electronic message and a recipient of the electronic message with an attendee field of the data entry interface.

5. The method of claim 1, wherein identifying comprises identifying a format of the temporal expression, and matching the format to an entry in a lookup table.

6. The method of claim 5, further comprising extracting the entry from the lookup table, and inserting the entry into the temporal field of the data entry interface.

7. The method of claim 1, wherein the temporal field is populated with the temporal expression based on an inferred date.

8. The method of claim 1, wherein identifying comprises, processing the electronic message using a lexical analyzer and a parser to identify a format of the temporal expression.

9. The method of claim 1, wherein identifying comprises processing the electronic message to identify a relative date expression in the electronic message.

10. The method of claim 9, wherein processing comprises processing the electronic message using a lexical analyzer and a parser to identify the relative date expression in the electronic message.

11. The method of claim 10, wherein the relative date expression includes at least one of today, tomorrow, yesterday, morning, noon, afternoon, evening, and night.

12. The method of claim 1, wherein the electronic message is one of an email, a peer-to-peer personal identification number (PIN) message, a short message service (SMS) message, a multimedia messaging service (MMS) message, and an instant message (IM).

13. The method of claim 1, wherein identifying comprises identifying a plurality of temporal expressions in the electronic message.

14. The method of claim 13, wherein for each of the plurality of temporal expression identified, the body includes an associated distinct user-selectable hyperlink.

15. The method of claim 14, comprising displaying a further data entry interface based on receipt of selection of one of the hyperlinks associated with one of the plurality of temporal expressions, the further data entry interface configured with a temporal field that is populated with the one of the plurality of temporal expressions, receiving, during the displaying of the further data entry interface, input that indicates acceptance of information in the data entry interface, the information including the one of the plurality of temporal expressions, and storing, in response to the input, a further event based on the information.

16. The method of claim 1, wherein the event is one of a calendar event and a task event.

17. The method of claim 1, wherein identifying a temporal expression comprises identifying a date and time expression.

18. The method of claim 1, wherein the temporal expression comprises a date expression.

19. The method of claim 1, further comprising, after receipt of the input that indicates selection of the hyperlink and before displaying the data entry interface, displaying a menu with a choice to create the event.

20. An electronic communication device processing a user-composed electronic message, the system comprising:
a display;
an input device;
a microprocessor configured for identifying a temporal expression in an electronic message, generating a user-selectable hyperlink corresponding with the temporal expression which was identified, displaying a body of the electronic message in response to the identifying, the body including the hyperlink, during the displaying of the body, an input that indicates receipt of selection of the hyperlink, displaying a data entry interface based on receipt of the input, the data entry interface configured with a temporal field that is populated with the temporal expression, receiving, during the displaying of the data entry interface, another input that indicates acceptance of information in the data entry interface, the information including the temporal expression, and storing, in response to receipt of the another input, an event based on the information.

21. The electronic communication device of claim 20, wherein the electronic communication device is one of a server and a wireless device.

22. The electronic communication device of claim 20, wherein the microprocessor is further configured for mapping text in the electronic message to another field of the data entry interface.

23. The electronic communication device of claim 22, wherein mapping text comprises associating a subject of the electronic message with a subject field of the data entry interface.

24. The electronic communication device of claim 22, wherein mapping text comprises associating at least one of a sender of the electronic message and a recipient of the electronic message with an attendee field of the data entry interface.

25. The electronic communication device of claim 20, wherein identifying comprises identifying a format of the temporal expression, and matching the format to an entry in a lookup table.

26. The electronic communication device of claim 25, wherein the microprocessor is further configured for extracting the entry from the lookup table, and inserting the entry into the temporal field of the data entry interface.

27. The electronic communication device of claim 20, wherein the temporal field is populated with the temporal expression based on an inferred date.

28. The electronic communication device of claim 20, wherein identifying comprises, processing the electronic message using a lexical analyzer and a parser to identify the format of the temporal expression.

29. The electronic communication device of claim 20, wherein identifying comprises processing the electronic message to identify a relative date expression in the electronic message.

30. The electronic communication device of claim 29, wherein processing comprises processing the electronic message using a lexical analyzer and a parser to identify the relative date expression in the electronic message.

31. The electronic communication device of claim 29, wherein the relative date expression includes at least one of today, tomorrow, yesterday, morning, noon, afternoon, evening, and night.

32. The electronic communication device of claim 20, wherein the electronic message is one of an email, a peer-to-peer personal identification number (PIN) message, a short message service (SMS) message, a multimedia messaging service (MMS) message, and an instant message (IM).

33. The electronic communication device of claim 20, wherein identifying comprises identifying a plurality of temporal expressions in the electronic message.

34. The electronic communication device of claim 33, wherein for each of the plurality of temporal expressions identified, the body includes an associated distinct user-selectable hyperlink.

35. The electronic communication device of claim 34, wherein the microprocessor is further configured for displaying a further data entry interface based on receipt of selection of one of the distinct hyperlinks associated with one of the temporal expressions, the further data entry interface configured with a temporal field that is populated with the one of the plurality of temporal expressions, receiving, during the displaying of the further data entry interface, input that indicates acceptance of information in the data entry interface, the information including the one of the plurality of temporal expressions, and storing, in response to the input, a further event based on the information.

36. The electronic communication device of claim 20, wherein the event is one of a calendar event and a task event.

37. The electronic communication device of claim 20, wherein the temporal expression comprises a date and time expression.

38. The electronic communication device of claim 20, wherein the temporal expression comprises a date expression.

39. The electronic communication device of claim 20, wherein the microprocessor is further configured for, after receipt of the input that indicates selection of the hyperlink and before displaying the date entry interface, displaying a menu with a choice to create the event.

* * * * *